(12) United States Patent
Ehrne (10) Patent No.: US 8,215,612 B2
(45) Date of Patent: Jul. 10, 2012

(54) SLIDING VALVE

(75) Inventor: Florian Ehrne, Feldkirch (AT)

(73) Assignee: VAT Holding AG, Haag (CH)

( * ) Notice: Subject to any disclaimer, the term of this patent is extended or adjusted under 35 U.S.C. 154(b) by 47 days.

(21) Appl. No.: 12/943,353

(22) Filed: Nov. 10, 2010

(65) Prior Publication Data

US 2011/0057136 A1   Mar. 10, 2011

Related U.S. Application Data

(63) Continuation of application No. PCT/AU2009/000190, filed on May 6, 2009.

(30) Foreign Application Priority Data

Jun. 12, 2008   (DE) .......................... 10 2008 027 944

(51) Int. Cl.
*F16K 25/00* (2006.01)
(52) U.S. Cl. .................... 251/204; 251/203; 251/326
(58) Field of Classification Search ................. 251/193, 251/203, 204, 326
See application file for complete search history.

(56) References Cited

U.S. PATENT DOCUMENTS

| | | | | |
|---|---|---|---|---|
| 587,107 | A | * | 7/1897 | Sherrerd ........................ 137/318 |
| 1,630,407 | A | * | 5/1927 | Roots ........................... 251/158 |
| 3,185,435 | A | | 5/1965 | Hauser |
| 3,397,862 | A | * | 8/1968 | Batzer et al. .................. 251/204 |
| 3,610,573 | A | * | 10/1971 | Robertson ..................... 251/167 |
| 4,470,576 | A | | 9/1984 | Schertler |
| 4,495,966 | A | * | 1/1985 | Longamore .............. 137/614.01 |
| 4,560,141 | A | | 12/1985 | Bosch |
| 5,188,145 | A | * | 2/1993 | Mathieu ......................... 137/340 |

(Continued)

FOREIGN PATENT DOCUMENTS

DE   504273   8/1930

(Continued)

*Primary Examiner* — John Fristoe, Jr
(74) *Attorney, Agent, or Firm* — Volpe and Koenig, P.C.

(57) ABSTRACT

A sliding valve including a valve body (1) with a wall having a valve opening (3) and a valve seat (4) surrounding the valve opening (3), a valve plate (5), at least one valve rod (8) that can move in the axial direction and can be moved for closing the valve starting from a first position in which the valve plate (5) assumes its open position, to a second position in which the valve plate (5) assumes an intermediate position covering the valve opening (3) but lifted from the valve seat (4), into a third position in which the valve plate (5) assumes its closed position. At least one lifting element (10, 11) moves the valve plate (5) from its intermediate position into its closed position, and at least one support unit (12) with at least one front and at least one rear support element (14, 13) that interact in the closed position of the valve plate (5) with at least one valve-body-fixed, front support element and at least one valve-body-fixed, rear support element (16, 15). In the second position of the valve rod (8), either the rear support elements (13, 15) or the front support elements (14, 16) are in engagement and the other of these support elements (14, 16; 13, 15) are spaced apart from each other. When moving the valve rod (8) from its second to its third position, the support unit (12) pivots about a rotational axis (17) from a starting position in which the other support elements (14, 16; 13, 15) are spaced apart from each other into an end position in which the other support elements (14, 16; 13, 15) contact each other.

12 Claims, 6 Drawing Sheets

U.S. PATENT DOCUMENTS

2006/0266417 A1   11/2006   Wu

FOREIGN PATENT DOCUMENTS

| | | |
|---|---:|---:|
| DE | 1093631 | 11/1960 |
| DE | 3209217 | 9/1983 |
| DE | 3224387 | 1/1984 |
| FR | 1379733 | 10/1964 |
| JP | 3318266 | 11/1933 |
| JP | 2001090849 | 4/2001 |
| JP | 2001187972 | 7/2001 |
| JP | 2001263505 | 9/2001 |
| JP | 2002039401 | 2/2002 |
| JP | 2002295695 | 10/2002 |
| JP | 2004204996 | 7/2004 |

\* cited by examiner

SLIDING VALVE

CROSS-REFERENCE TO RELATED APPLICATIONS

This application is a continuation of PCT/AT2009/000190, filed May 6, 2009, which claims the benefit of German Patent application No. 102008027944.7, filed Jun. 12, 2008, both of which are incorporated herein by reference as if fully set forth.

BACKGROUND

1. Field of the Invention

The invention relates to a sliding valve comprising:
- a valve body with a wall having a valve opening and a valve seat surrounding the valve opening,
- a valve plate that can be moved between an open position in which it frees the valve opening, an intermediate position in which it covers the valve opening but is raised from the valve seat, and a closed position in which it is pressed onto the valve seat,
- at least one valve rod that can move in the axial direction and can be moved for closing the valve starting from a first position in which the valve plate assumes its open position, to a second position in which the valve plate assumes its intermediate position, and into a third position in which the valve plate assumes its closed position,
- at least one lifting element that is activated by the movement of the valve rod from its second into its third position and acts on the valve plate for moving the valve plate from its intermediate position into its closed position, and
- at least one support unit with at least one front support element with respect to the closing direction of the valve rod and at least one rear support element, wherein these support elements interact in the closed position of the valve plate with at least one valve-body-fixed, front support element and at least one valve-body-fixed, rear support element, in order to block a movement of the support unit directed away from the valve opening.

2. Description Of Related Prior Art

Vacuum valves according to a type of sliding valve or plate valve in which the valve opening is closed by the movement of a valve plate that is pressed onto the valve seat surrounding the valve opening have become known in many different constructions. Here, in order not to expose the seal consisting of an elastic material to shearing stress that is too strong, it is known to perform the closing movement of the valve plate in two steps. In a first section of the closing path that comprises the large part of the extent of the closing path, the valve plate is moved from an open position freeing the valve opening into an intermediate position covering the valve opening but still lifted from the valve seat. In the end section of the closing path, the valve plate is moved from the intermediate position into the closed position in which it is pressed onto the valve seat and seals the valve opening.

For a conventional type of sliding valve, this two-step movement process of the valve plate is caused by mechanical lifting elements that are arranged between a plate-shaped support unit moved by a valve rod and the valve plate. These mechanical lifting elements could involve roll bodies that are guided in wedge-shaped gaps between the valve plate and the plate-shaped support unit, lever mechanisms, or tilting elements between these two plates. To avoid or limit bending of the valve rod in the second movement step, the plate-shaped support unit or a support plate is similarly supported by mechanical elements used for spreading open the valve with the plate-shaped support unit against a wall of the valve housing opposite the valve seat. Such sliding valves are known, for example, from U.S. Pat. No. 4,560,141, DE 3 209 217 C2, DE 3224387 C2, and U.S. Pat. No. 3,185,435.

Plate valves or sliding valves in which, in the first section of the closing movement, the valve plate is shifted in a linear fashion parallel to the plane of the valve seat and is shifted in the end section of the closing movement essentially at a right angle to the valve seat and is pressed onto this valve seat, are also designated as L-valves. In the end section of the closing movement, if the movement is realized at an angle to the direction of movement of the first step and at an angle to the plane of the valve seat, then the designation J-valve is also used.

A sliding valve of the type noted above is known from JP 2001-263505 A. The support unit comprises, at least in one part of the shown embodiments, a plate-shaped section that interacts with the valve plate through the use of lifting elements, as well as a U-shaped section by which the support unit is attached directly to the valve rod. The free leg of the U-shaped section, which points in the closing direction of the valve rod, and the front end of the plate-shaped section form support elements that interact with valve-body-fixed support elements. These valve-body-fixed support elements are attached directly to or constructed integrally with the wall having the valve opening, so that a direct force transmission is achieved without a bypass via other walls of the valve body. The contact force of the valve plate onto the valve seat is reached due to the movement of the valve rod from its second into its third position, wherein the valve plate contacts a stop with its front end. While the contact force is building up, this leads to a relative movement both between the rear and also between the front interacting support elements, wherein particles are also generated undesirably.

SUMMARY

The objective of the invention is to provide a sliding valve of the type noted above in which, when the valve plate is pressed onto the valve seat, a relative movement of interacting support elements under pressure is avoided or at least reduced.

According to the invention, this is possible through a sliding valve comprising:
- a valve body with a wall having a valve opening and a valve seat surrounding the valve opening,
- a valve plate that can be moved between an open position in which it frees the valve opening, an intermediate position in which it covers the valve opening but is lifted from the valve seat, and a closed position in which it is pressed onto the valve seat,
- at least one valve rod that can move in the axial direction and can be moved for closing the valve starting from a first position in which the valve plate assumes its open position to a second position in which the valve plate assumes its intermediate position into a third position in which the valve plate assumes its closed position,
- at least one lifting element that is activated by the movement of the valve rod from its second into its third position and acts on the valve plate for moving the valve plate from its intermediate position into its closed position, and
- at least one support unit with at least one front and at least one rear support element with respect to the closing direction of the valve rod, wherein these support elements interact in the closed position of the valve plate with at least one valve-body-fixed, front support element and at least one valve-body-fixed, rear support element, in order to block a movement of the support unit directed away from the valve opening, wherein, in the second position of the valve rod, either the rear support element or the front support element are engaged and the other support elements are spaced apart from each other and wherein, when moving the valve rod from its second to its third position, the support unit pivots about a rotational axis from a starting position in which the other support elements are spaced apart from each other into an end position in which the other support elements contact each other.

For the sliding valve of the invention, in the second position of the valve rod, either the at least one rear support element of the support unit comes into engagement with the at least one valve-body-fixed, rear support element or the at least one front support element of the support unit comes into engagement with the at least one valve-body-fixed, front support element. In the second position of the valve rod, if the rear support elements are led into engagement, then in the second position of the valve rod the at least one front support element of the support unit is still spaced apart from the at least one valve-body-fixed, front support element. In the second position, when the front support elements are led into engagement, then in the second position of the valve rod the at least one rear support element of the support unit is still spaced apart from the at least one valve-body-fixed, rear support element. When the valve rod moves from its second into its third position, the support unit is rotated about a rotational axis and the support elements spaced apart in the second position of the valve rod are led into engagement. Thus, a relative movement between these support elements in a state contacting each other under pressure can be avoided. In the position of the valve rod after which the pressing of an elastic seal acting between the valve plate and the valve seat begins, if the rotation of the support unit about the rotational axis is already completely or largely completed, then a relative movement of the parts forming the rotational axis realized under an elevated pressure can also be completely or at least largely prevented.

Advantageously, at least one counter lifting element acts between the valve rod and the support unit. If either the front or the rear support elements are led into engagement in the closing of the valve in the second position of the valve rod, then further linear movement of the support unit is blocked by this interacting support element. The valve rod is then pushed farther into its third position, wherein at least one counter lifting element activated by this movement of the valve rod and acting between the valve rod and the support unit pivots the support unit from its starting position into its end position that it assumes in the third position of the valve rod.

Advantageously, the valve-body-fixed, front and rear support elements are attached to the wall having the valve opening or constructed integrally with this wall. The front and rear support elements are thus arranged on the wall having the valve opening in front of and behind the valve opening with respect to the closing direction of the valve rod. Therefore, in the closed position of the valve plate, the support force required for pressing the valve plate is transmitted directly onto the wall having the valve opening. A wall of the valve body opposite the valve opening is thus not required or, if such a wall is present, in order to form a valve housing, a support force for pressing the valve plate on the valve seat must not be received by such an opposing wall. Thus, the construction of the valve could be comparatively narrow or deformation of such an opposing wall caused by the support force could be avoided.

It is also conceivable and possible to provide the valve-body-fixed, front support element and/or the valve-body-fixed, rear support element on side walls of the valve body (to attach to or to form integrally with these walls), standing, e.g., perpendicular to the wall having the valve opening. In such a construction, at least one wall opposite the wall having the valve opening is also not required or deformations caused by the support force could be kept relatively low.

Advantageously, the support unit is connected to the valve plate by at least one holding part by which, when the valve is closed, when the second position of the valve rod is reached, a movement of the support unit in the closing direction is blocked by the interacting support elements, a movement of the valve plate in the closing direction of the valve rod is blocked at least before reaching the third position of the valve rod, but a pivoting of the support unit relative to the valve plate about the rotational axis is made possible. If a further movement of the valve plate in the closing direction of the valve rod is blocked, then for the further movement of the valve rod into its third position, the at least one lifting element is activated, in order to shift the valve plate in the direction toward the valve seat and to press onto this seat. An impact of the valve plate itself on the valve body or on a part attached to this valve body can therefore be avoided.

Preferably, the holding part or at least one of the holding parts has a spring-elastic construction. By retracting the valve rod from its third into its second position, the spring elasticity of this holding part pivots the support unit back into its starting position and lifts the valve plate from the valve seat.

In one advantageous embodiment of the invention, a rotational support is constructed by the support elements led into engagement during the closing of the valve in the second position of the valve rod, wherein this rotational support forms the rotational axis about which the support unit pivots during the movement of the valve rod from its second into its third position.

In this publication, when the discussion is of "front" and "rear," then this refers to the closing direction of the valve rod. A part lying farther toward the front thus has a greater distance from a rear end of the valve rod in the region of which this is pushed by an actuator than a part lying farther toward the rear.

BRIEF DESCRIPTION OF THE DRAWINGS

Additional advantages and details of the invention will be explained below with reference to the accompanying drawings.

in the drawing.

DETAILED DESCRIPTION OF THE PREFERRED EMBODIMENTS

A preferred embodiment of a sliding valve or plate valve provided for vacuum applications according to the invention will be explained below with reference to FIGS. 1 to 13. The sliding valve has a valve body 1 that has a wall 2 with a valve opening 3. In the closed state of the valve, a valve plate 5 is pressed onto the valve seat 4 surrounding the valve opening 3, in order to seal the valve opening 3 vacuum-tight using a sealing ring 6 made from an elastic material, for example, Viton®. The sealing ring 6 is arranged on the valve plate 5 in the illustrated embodiment and is pressed onto a sealing face of the valve seat 4. It is also conceivable and possible to arrange the sealing ring 6 on the valve seat 4 and the sealing face on the valve plate 5.

In the opened state of the sliding valve (FIGS. 1, 6, and 10), the valve plate 5 frees the valve opening 3, wherein it is advantageously arranged completely next to the valve opening 3 viewed in the direction of the axis 7 of the valve opening 3. In the closed state of the valve (cf. FIGS. 2 to 5, 9 and 13), the valve plate 5 is pressed onto the valve seat 4, in order to seal the valve opening 3. When the valve is closed, the closed position of the valve plate 5 is reached starting from the open position via an intermediate position in which it covers the valve opening 3, but is lifted from the valve seat 4 viewed in the direction of the axis 7 of the valve opening 3 (cf. FIGS. 8 and 12).

For opening and closing the valve, at least one valve rod 8 is used that carries the valve plate 5. Each valve rod 8 can be moved for closing the valve in a closing direction 9 lying parallel to its longitudinal axis, wherein it can be moved starting from a first position in which the valve plate 5 assumes its open position to a second position in which the valve plate 5 assumes its intermediate position, into a third position in which the valve plate 5 assumes its closed position. When the valve rod 8 is shifted from its first position into its second position, the valve plate 5 is carried along by the valve rod 8 and here pushed in a straight line in the closing direction 9 of the valve rod 8 and advantageously perpendicular to the axis 7. When the valve rod 8 moves from its second into its third position, the valve plate 5 is moved in the direction toward the valve seat 4 approximately parallel to the axis 7 (the angle relative to the axis 7 advantageously equals less than 30°).

In the illustrated embodiment, three valve rods 8 are provided. A valve according to the invention could also have more or less than three valve rods 8.

In this embodiment, the valve plate 5 is connected to the valve rod 8 by two lifting elements 10, 11 that are formed by pivot levers. These are supported so that they can pivot on one hand on the valve plate 5 and, on the other hand, on the valve rod 8. The pivot axes lie parallel to each other and perpendicular to the closing direction 9. The lifting elements 10, 11 form a parallelogram guide for the valve plate 5 relative to the valve rod 8. By the use of these lifting elements 10, 11, the valve plate 5 is moved from its intermediate position into its end position when the valve rod 8 is pushed from its second into its third position.

Instead of two lifting elements 10, 11, only one lifting element could also be provided or more than two lifting elements could be provided. Lifting elements acting differently mechanically than pivot levers are also conceivable and possible, for example, wedge elements, crank guides, or the like. A parallel guide of the valve plate 5 relative to the valve rod 8 using the lifting elements acting between the valve rod 8 and the valve plate 5, however, is preferably not necessary.

The valve rod 8 further carries at least one support unit 12 that lies at least partially, advantageously for the most part, on the side of the valve plate 5 facing away from the valve seat 4. In the shown embodiment, three support units 12 are provided corresponding to the three valve rods 8. The number of support units 12 advantageously corresponds to the number of valve rods 8. It would also be conceivable and possible to provide a common support unit 12, for example, also in the case of multiple valve rods 8.

The support unit 12 has at least one rear support element 13 relative to the closing direction 9 of the valve rod 8 and at least one front support element 14 lying farther toward the front than the rear support element 13 relative to the closing direction 9. The at least one rear support element 13 of the support unit 12 interacts in the closed position of the valve plate 5 with at least one valve-body-fixed supported element 15 arranged at the rear and the at least one front support element 14 of the support unit 12 interacts in the closed position of the valve plate 5 with at least one valve-body-fixed support element 16 arranged at the front. The interacting rear and front support elements 13, 15; 14, 16 transmit, in the closed position of the valve plate 5, a supporting force onto the valve body 1, in order to keep the valve plate 5 pressed onto the valve seat 4.

In the illustrated embodiment, a respective, valve-body-fixed, front support element is arranged with respect to the closing direction 9 in front of the valve opening 3 and a respective, valve-body-fixed, rear support element 15 is arranged with respect to the closing direction 9 behind the valve opening 3, as is preferred. The front and rear support elements 16, 15 are here formed by parts fixed rigidly on the wall 2. An integral construction with the wall 2 is likewise possible.

Figure 1:
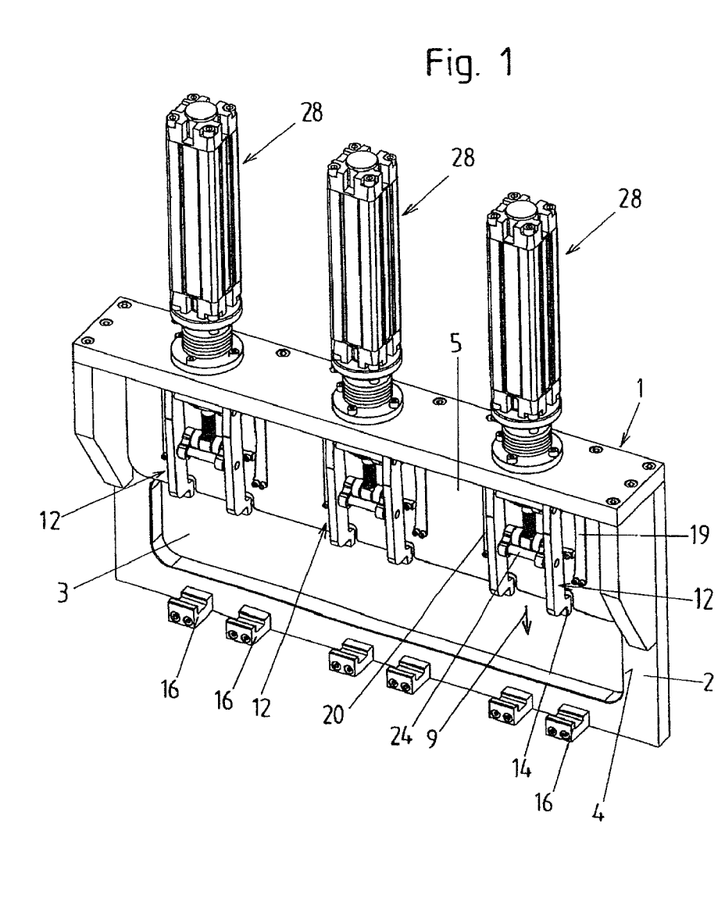
FIGS. 1 and 2 are perspective views of a sliding valve according to the invention in the opened and in the closed states.
Figure 2:
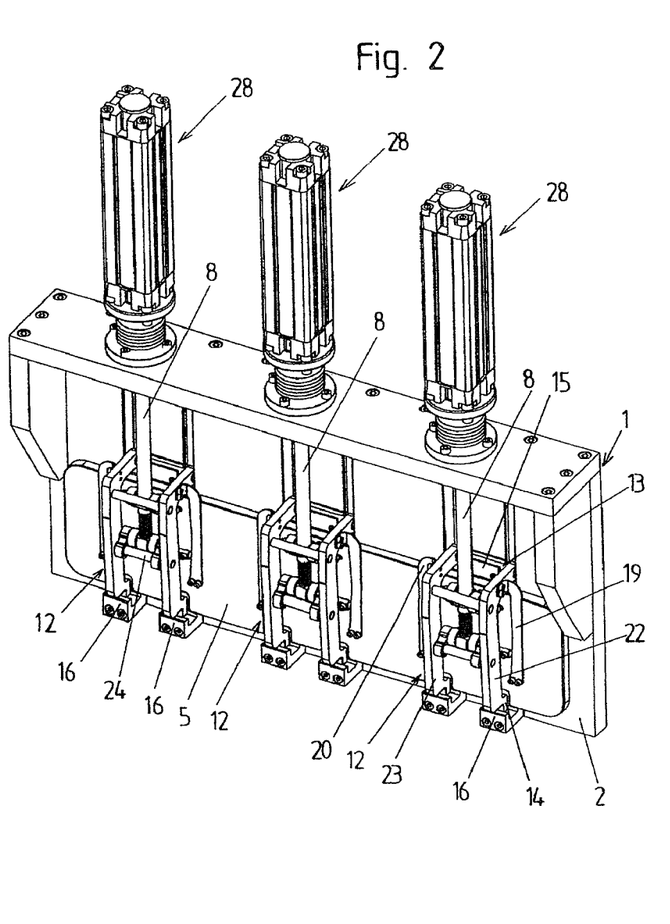
Figure 3:
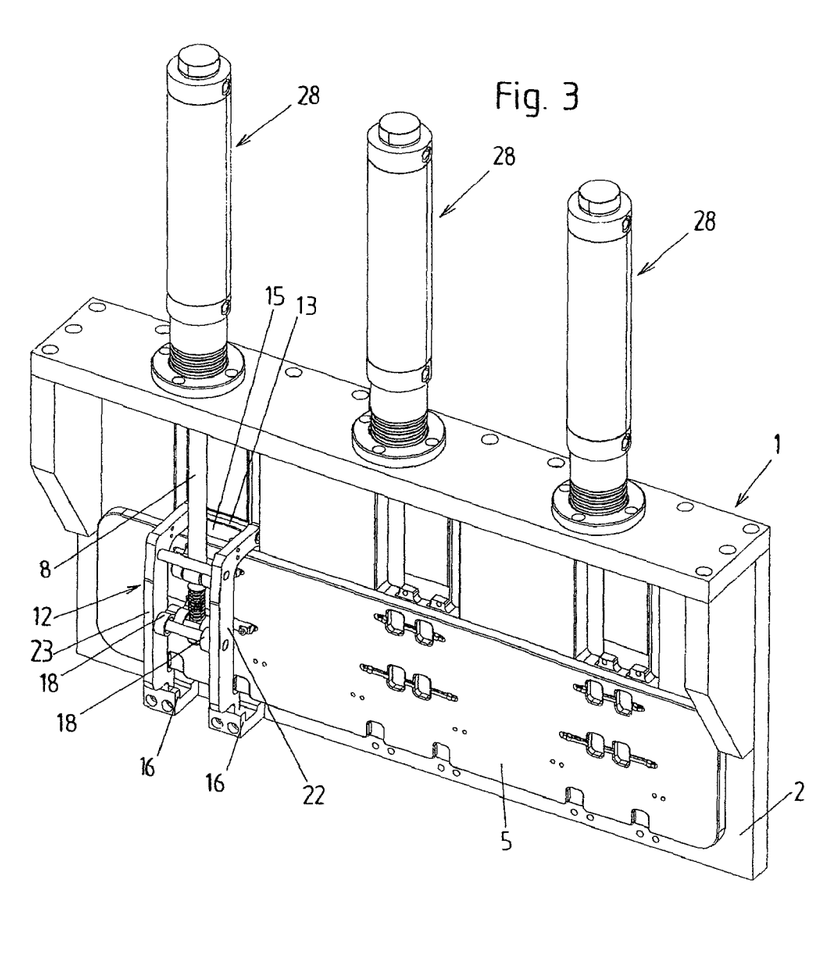
FIG. 3 is a perspective view according to FIG. 2, wherein parts of the valve are removed and also the actuators for moving the valve rod are shown somewhat differently, although these could similarly be constructed as in FIGS. 1 and 2.
Figure 4:
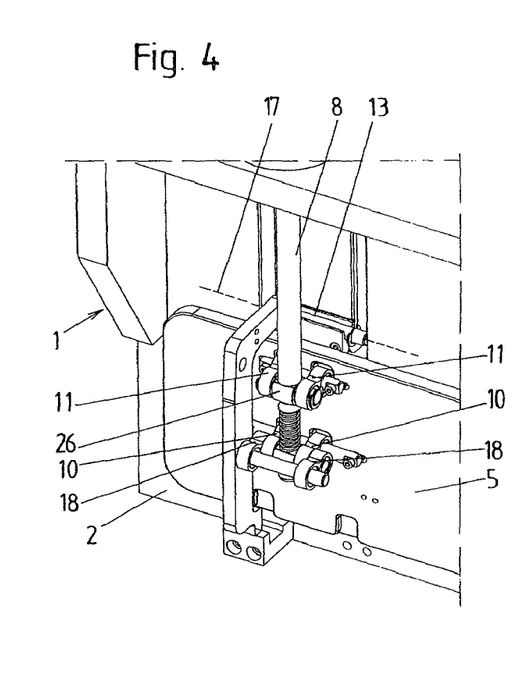
FIG. 4 is an enlarged cutout from FIG. 3, with additional parts of the valve removed.
Figure 5:
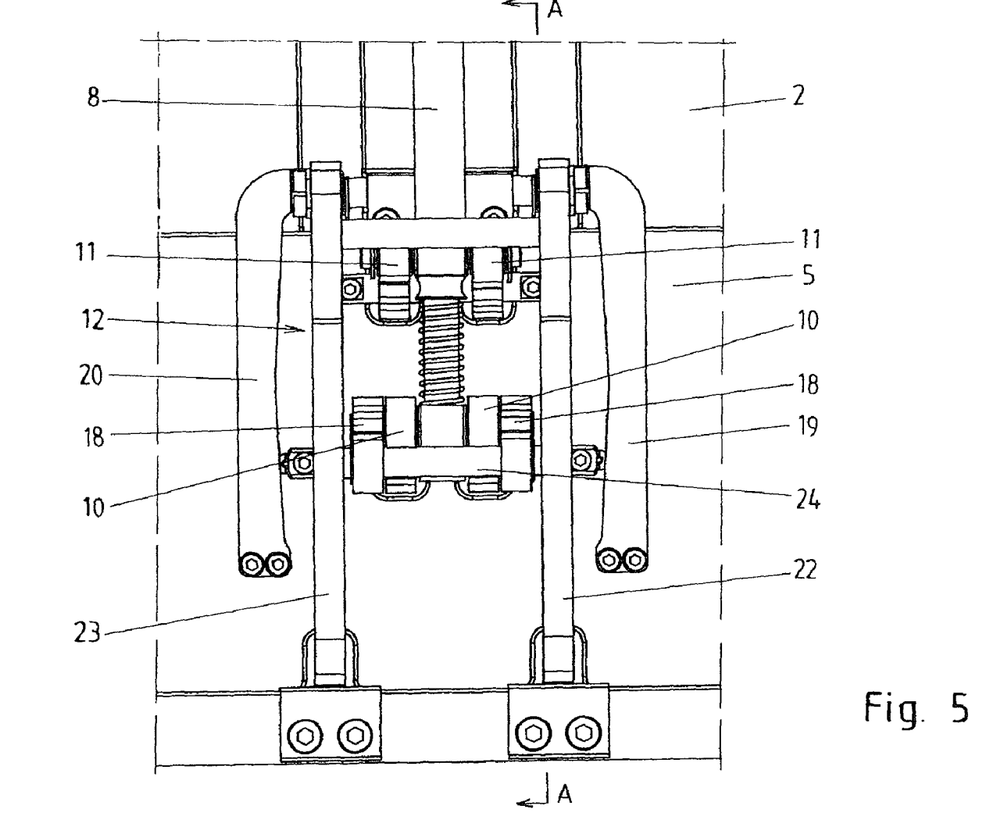
FIG. 5 is an enlarged cutout of the closed valve, in front view.
Figure 6:
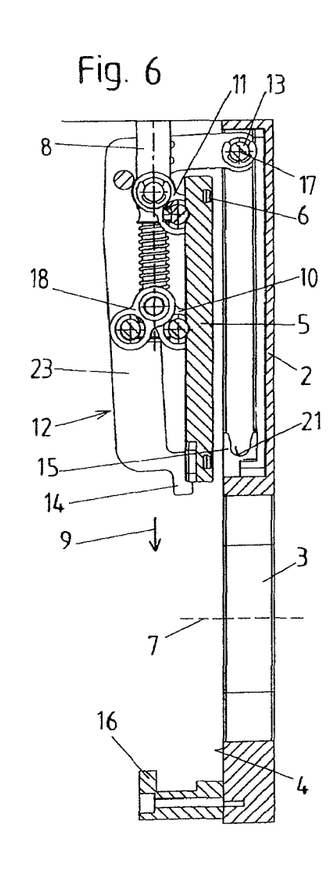
FIGS. 6 to 9 are cross-sectional views taken along the line A-A from FIG. 5 in the open position of the valve plate (FIG. 6), shortly before reaching the intermediate position of the valve plate (FIG. 7), in the intermediate position of the valve plate (FIG. 8), and in the closed position of the valve plate (FIG. 9)
Figure 7:
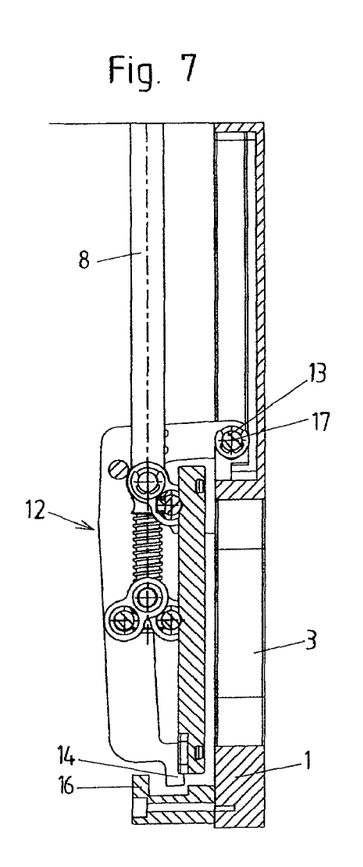
Figure 8:
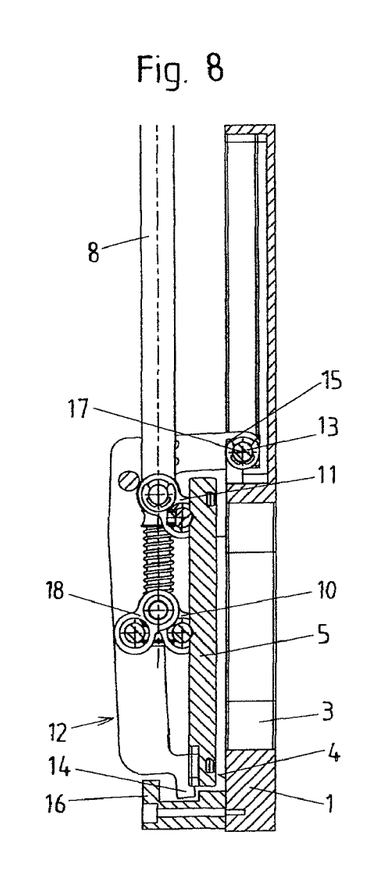
Figure 9:
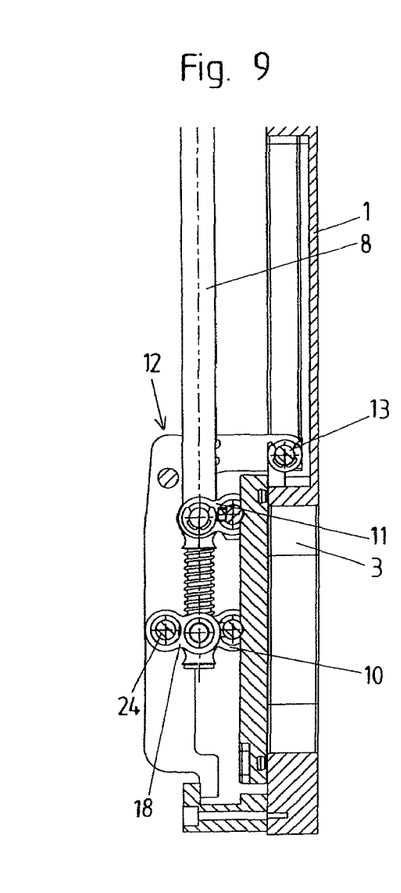
Figure 10:
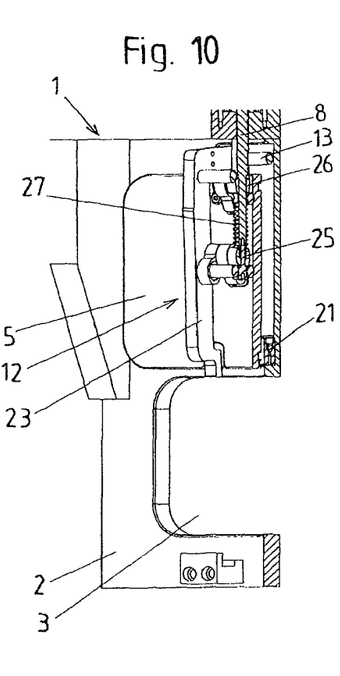
FIGS. 10 to 13 are perspective views according to FIG. 3 of a part of the valve sectioned in the region of the longitudinal middle of the valve rod in the position according to FIGS. 6 to 9.
Figure 11:
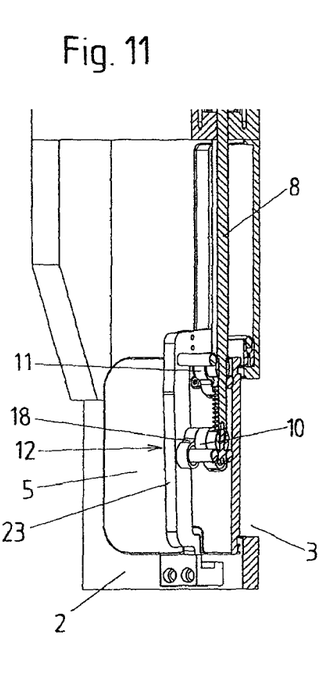
Figure 12:
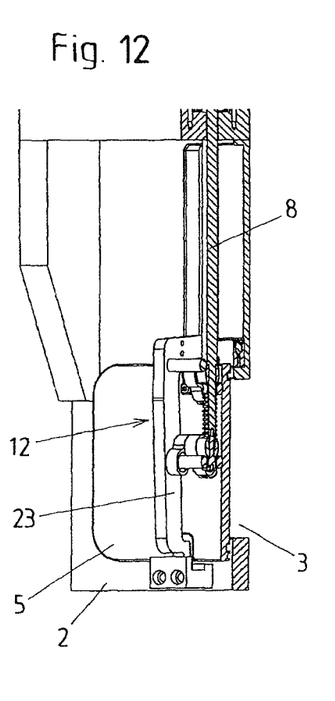
Figure 13:
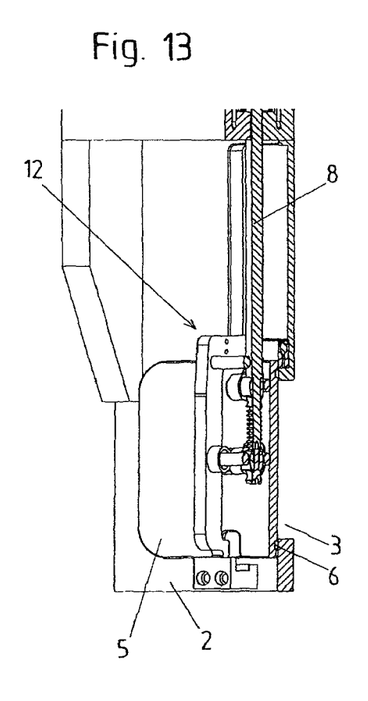

The rear support elements 13, 15 come into complete engagement when the valve rod 8 has reached the second position when the valve is closed (FIGS. 8 and 12). The front support elements 14, 16 are spaced apart from each other in this position of the valve rod 8 and, indeed, in the direction of the axis 7 of the valve opening 3. The rear support elements 13, 15 in engagement with each other form a rotational support with a rotational axis 17 about which the respective support unit 12 pivots when the valve rod 8 moves from the second into the third position, and indeed from a starting position that the support unit 12 assumes in the second position of the valve rod 8 and in which the front support elements 14, 16 are spaced apart from each other into an end position that the support unit 12 assumes in the third position of the valve rod 8 and in which the front support elements 14, 16 are in engagement, i.e., contact each other (c.f., e.g., FIGS. 9 and 13). Through the mutual engagement of the rear support elements 13, 15 in the second position of the valve rod 8, a further movement of the respective support unit 12 is also blocked when the valve rod 8 is moved farther into its third position. The mentioned rotation about the rotational axis 17 is now possible.

For the rotation of the respective support unit 12 about the rotational axis 17 when the valve rod 8 moves from its second into its third position, at least one counter lifting element 18 is used that is formed in the illustrated embodiment by a pivot lever that is attached on one hand so that it can pivot on the valve rod 8 and on the other hand so that it can pivot on the support unit 12. The pivot axes lie parallel to each other and perpendicular to the closing direction 9. Through the pivoting of this pivot lever when the valve rod 8 moves from its second into its third position, the support unit 12 is pivoted about the rotational axis 17. The position at which the counter lifting element 18 engages the support unit 12 is moved approximately in the opposite direction (along an arc of a circle) like the valve plate 5. The lifting elements 10, 11 and the counter lifting element 18 generate movements in approximately opposite directions for the movement of the valve rod 8 from its second into its third position.

Counter lifting elements acting mechanically in other ways are also conceivable and possible, for example, wedge elements, crank elements, or the like. Although the use of a counter lifting element 18 for each support unit 12 is basically sufficient, two or more such counter lifting elements 18 for each support unit 12 could also be used.

The support unit 12 is connected to the valve plate 5 by holding parts 19, 20 that are formed in the shown embodiment by bent, spring-elastic strips made from a leaf-shaped material, advantageously spring steel (=bent leaf springs). The strip-shaped holding parts 19, 20 run, apart from a bent or angled end section, essentially in the longitudinal direction of the valve rod 8. The holding parts 19, 20 prevent at least largely a movement of the respective support unit 12 relative to the valve plate 5. For the movement of the valve rod 8 from its second into its third position, when the support unit 12 is prevented from further movement in the closing direction 9 by the interacting support elements 13, 15, the movement of the valve plate 5 relative to a respective support unit 12 equals less than half the path covered by the valve rod 8.

Due to their spring elasticity, however, the holding parts 19, 20 allow a pivoting of the respective support unit 12 relative to the valve plate 5. The valve plate 5 thus could maintain an orientation parallel to the valve seat 4, while the support unit 12 pivots about the rotational axis 17 when the valve rod 8 is pushed from its second into its third position.

Through the at least substantial prevention of a movement of the valve plate 5 relative to the respective support unit 12 with respect to the longitudinal direction of the valve rod 8, after the support elements 13, 15 are led into engagement in the second position of the valve rod 8, a further movement of the valve plate 5 in the closing direction 9 is at least largely prevented. Therefore, when the valve rod 8 is moved from its second into its third position, this results in a movement of the valve rod 8 relative to the valve plate 5 in the closing direction 9 of the valve rod 8, wherein the at least one lifting element 10, 11 is activated between the valve rod 8 and the valve plate 5 and the valve plate 5 is pressed onto the valve seat 4.

Instead of two holding parts 19, 20 for each support unit 12, more or fewer holding parts for each support unit 12 could also be provided. A different construction of the holding parts 19, 20 in the form of leaf-shaped, spring-elastic strips is also conceivable and possible. A spring elasticity of the holding parts 19, 20, however, is preferred, in order to generate, when the valve rod 8 is retracted from its third into its second position, a restoring force through which, on one hand, the support unit 12 is pivoted back into its starting position and, on other hand, the at least one lifting element 10, 11 is reset for the valve plate 5, wherein the valve plate 5 is lifted from the valve seat 4.

In the illustrated embodiment, for the support elements 13, 15 forming the pivot bearing in the engaged state, the at least one valve-body-fixed support element 15 has a U-shaped construction viewed in cross section (cf., e.g., FIG. 10 that also shows a cross section through the valve plate 5) or viewed in the direction of the rotational axis 17 (cf. FIG. 6), wherein it has a circular-arc-shaped bearing face 21 on which the at least one held, rear support element 13 of the support unit 12 contacts with a circular-arc-shaped contact face. This held support element 13 is constructed in the shown embodiment in the form of a pin with circular cross section whose longitudinal axis forms the rotational axis 17. Other constructions of support elements 15, 13 with bearing and contact faces that form rotational supports in the interacting state are also conceivable and possible. For example, only the bearing face 21 of the support element 15 or only the contact face of the support element 13 has a circular-arc-shaped construction.

On the other hand, the support element 13 of the support unit 12 could also have a U-shaped construction viewed in cross section (wherein this U-shaped cross section would then open in the closing direction 9) and could have a bearing face on which a contact face of the held, valve-body-fixed support element 15, in order to construct a rotational bearing.

In the illustrated embodiment, a respective support unit 12 is formed by two L-shaped brackets 22, 23 that are connected to each other by pins of which one forms the rear support element 13 and of which another pin 24 supports the counter lifting element 18 formed by pivot levers so that it can rotate. The front ends of the brackets 22, 23 that are offset here with respect to the closing direction 9 form the front support elements 14 of the support unit 12 and interact in the closed state of the valve with the valve-body-fixed, front support elements 16 formed by the projections. Other different constructions of the support unit 12 are conceivable and possible.

For the rotating support of the lifting elements 10, 11 constructed in the form of pivot levers and counter lifting element 18 on the valve rod 8, a front and a rear bearing part 25, 26 are used. The front bearing part is screwed onto the end of the valve rod 8. The rear bearing part 26 is placed on a tapered end section of the valve rod 8 and is pressed by a spring 27 on a projection of the valve rod 8. Instead of a spring 27, a sleeve pushed onto the valve rod 8 could also be arranged between the front and rear bearing parts 25, 26. Other constructions for rotating supports of pivot levers are conceivable and possible.

When the valve is closed starting from its opened state, then a respective valve rod 8 is initially moved from its first position to its second position and then into its third position by an actuator 28, for example, a hydraulic piston-cylinder unit. In the first position of the valve rod 8, the valve plate 5 assumes its open position and is initially carried along with this when the valve rod 8 is moved until it has reached, in the second position of the valve rod 8, its intermediate position. The respective support unit 12 is also carried along with the valve rod until then during the movement of the valve rod 8. When the second position of the valve rod 8 is reached, for the further movement of the valve rod 8, a further movement of the support unit 12 is blocked and the support unit 12 is pivoted about the rotational axis 17 by the at least one counter lifting element 18. The movement of the valve plate 5 is also blocked when the second position of the valve rod 8 is reached or shortly up to this position (in any case before the valve rod 8 reaches its third position) and is consequently moved by the at least one lifting element 10, 11 in the direction toward the valve seat 4. Through the pivoting of the support unit 12 about the rotational axis 17, a bending of the valve rod 8 is also at least largely avoided when the valve plate 5 moves from its intermediate position into its end position.

When the valve is opened, the described steps are performed in the reverse sequence.

Figure 14:
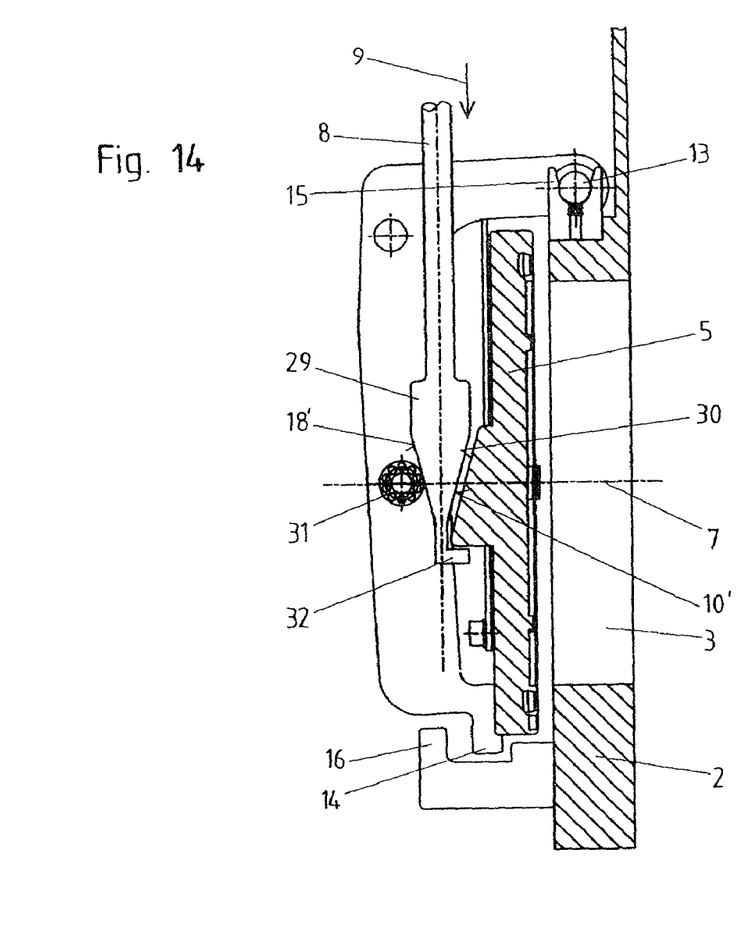
FIG. 14 is a schematic diagram of a part of a sliding valve according to another embodiment of the invention in the intermediate position of the valve plate in a section analogous to the section of FIG. 8.

Another embodiment of the invention is shown schematically in FIG. 14. The difference with the embodiment described above consists, primarily, in the construction of the at least one lifting element 10' and counter lifting element 18'. These are formed by wedge faces on an end piece 29 of the valve rod 8. The wedge face forming the lifting element 10' here interacts with an inclined face 30 arranged on the valve plate 5, wherein the parallel alignment of the valve plate 5 opposite the valve seat 4 is achieved. The wedge face forming the counter lifting element 18' interacts with a roll 31 arranged on the support unit 12.

When the valve is opened, a catch 32 arranged on the front end of the end piece 29 carries along the valve plate 5 and with it the support units 12 when the valve rod 8 has reached the second position and is retracted farther in the direction of the first position.

Figure 15:
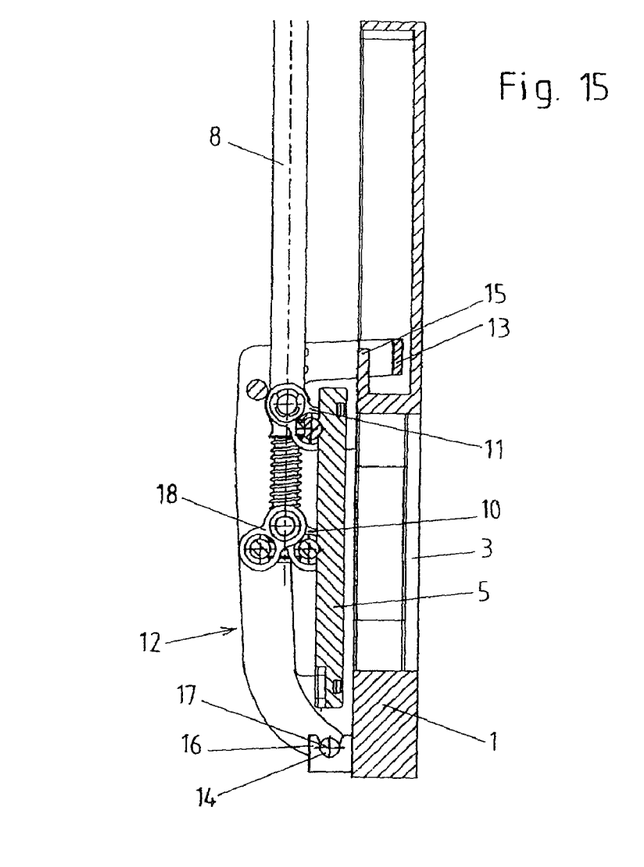
FIG. 15 is a schematic diagram of a sliding valve according to another embodiment of the invention in the intermediate position of the valve plate in a section analogous to the section of FIG. 8.

Furthermore, FIG. 15 shows a schematic diagram of an embodiment in which, when the valve is closed in the second position of the valve rod 8, the front support elements 14, 16 are led into engagement and form the rotational support for the respective support unit 12. The support unit 12 is consequently pivoted about the rotational axis 17 formed by this rotational support until, in the third position of the valve rod 8, the rear support elements 13, 15 are led into engagement. Apart from the transposition of the functions of the support elements and the associated reversal of the pivoting direction of the support unit 12, the valve is constructed in a completely analogous way as described in the first embodiment.

In the embodiments of the invention described above, the rotational support with the rotational axis 17 is constructed by the support elements led into engagement in the second position of the valve rod 8. Instead, for example, a rotational support could be constructed between the rear support element 13 of the support unit 12 formed by the pin (FIGS. 1 to 14) or between the front support element 14 of the support unit (12) formed by the pin (FIG. 15) and the brackets 22, 23 of the support unit 12. A construction of the rotational support forming the rotational axis 17 between other parts of the support unit 12 that are located between the support elements interacting in the second position of the valve rod 8 and a section of the support unit 12 that has the counter lifting element 18, 18' is also conceivable and possible. In these embodiments, a pivoting ability between the support elements interacting in the second position of the valve rod 8 can also be eliminated.

As follows from the description above, the field of the invention is not limited to the illustrated embodiments, but instead should be defined with reference to the appended claims together with their full scope of possible equivalents. While the description above and the drawings present the invention, for someone skilled in the art it is obvious that different elements could be implemented without leaving the actual spirit and scope of the invention.

Legend to the Reference Symbols
1 Valve body
2 Wall
3 Valve opening
4 Valve seat
5 Valve plate
6 Sealing ring
7 Axis
8 Valve rod
9 Closing direction
10, 10' Lifting element
11 Lifting element
12 Support unit
13 Rear support element
14 Front support element
15 Rear support element
16 Front support element
17 Rotational axis
18, 18' Counter lifting element
19 Holding part
20 Holding part
21 Bearing face
22 Bracket
23 Bracket
24 Pin
25 Front bearing part
26 Rear bearing part
27 Spring
28 Actuator
29 End piece
30 Inclined face
31 Roll
32 Catch

The invention claimed is:

1. A sliding valve comprising:

a valve body (1) with a wall (2) having a valve opening (3) and a valve seat (4) surrounding the valve opening (3);

a valve plate (5) that is movable between an open position in which the valve opening (3) is free, an intermediate position in which the valve plate covers the valve opening (3) but is lifted from the valve seat (4), and a closed position in which the valve plate is pressed onto the valve seat (4);

at least one valve rod (8) that can move in an axial direction and can be moved for closing the valve starting from a first position in which the valve plate (5) assumes the open position, to a second position in which the valve plate (5) assumes the intermediate position, into a third position in which the valve plate (5) assumes the closed position;

at least one lifting element (10, 11, 10') that is activated by movement of the valve rod (8) from the second into the third position and acts on the valve plate (5) for moving the valve plate (5) from the intermediate position into the closed position; and at least one support unit (12) with at least one front support element (14) and at least one rear support element (13) with respect to a closing direction (9) of the valve rod (8), the support elements interact, in the closed position of the valve plate (5), with at least one valve-body-fixed, front support element and at least one valve-body-fixed, rear support element (16, 15), in order to block a movement of the support unit (12) directed away from the valve opening (3);

wherein, in the second position of the valve rod (8), one of the rear support elements (13, 15) or the front support elements (14, 16) are engaged and the other of the rear support elements or the front support elements (14, 16; 13, 15) are spaced apart from each other and, when the valve rod (8) is moved from the second to the third position, the support unit (12) pivots about a rotational axis (17) from a starting position in which the other support elements (14, 16; 13, 15) are spaced apart from each other into an end position in which the other support elements (14, 16; 13, 15) contact each other.

2. The sliding valve according to claim 1, wherein at least one counter lifting element (18, 18') is provided that is activated by the movement of the valve rod (8) from the second into the third position and acts on the support unit (12) for pivoting the support unit (12) from the starting position into the end position when the valve rod (8) is moved from the second to the third position.

3. The sliding valve according to claim 2, wherein the at least one counter lifting element (18) is a pivot lever supported for pivoting movement on the valve rod (8) and for pivoting movement on the support unit (12).

4. The sliding valve according to claim 1, wherein the at least one lifting element (10, 11) is a pivot lever supported for pivoting movement on the valve rod (8) and for pivoting movement on the valve plate (5).

5. The sliding valve according to claim 4, wherein the valve plate (5) is connected to the valve rod (8) by at least two of the lifting elements (10, 11) that are formed by the pivot levers and move the valve plate (5) parallel to the valve rod (8) when the valve rod (8) is moved from the second to the third position.

6. The sliding valve according to claim 1, wherein, for the support elements (13, 15) forming the pivot lever in the connected state, at least one has a U-shaped construction viewed in cross section and has a bearing face (21) which contacts a contact face of the support element (13) held by the U-shaped support element (15).

7. The sliding valve according to claim 6, wherein the U-shaped support element (15) is fixed to the valve body.

8. The sliding valve according to claim 1, wherein the valve-body-fixed, front and rear support elements (16, 15) are attached to or constructed integrally with the wall (2) having the valve opening (3) in front of and behind the valve opening (3) with respect to the closing direction (9) of the valve rod (8).

9. The sliding valve according to claim 1, wherein the support unit (12) is connected to the valve plate (5) by at least one holding part (19, 20) by which, when moving the valve rod (8) from the second to the third position, a movement of the valve plate (5) in the closing direction (9) of the valve rod (8) is blocked before the valve rod (8) reaches the third position, but which allows a pivoting of the support unit (12) relative to the valve plate (5) about the rotational axis (17) formed by the support elements (13, 15) in engagement.

10. The sliding valve according to claim 9, wherein the holding part (19, 20) or at least one of the holding parts (19, 20) has a spring-elastic construction and applies a load, when the valve is opened starting from the closed state, on the support unit (12) with respect to a rotation about the rotational axis (17) in a direction of the starting position of the support unit and applies a load on the valve plate (5) in a direction of lifting from the valve seat (4).

11. The sliding valve according to claim 10, wherein the at least one spring-elastic holding part (19, 20) has at least one section that has a strip made from a leaf-shaped, spring-elastic material extending essentially parallel to the valve rod (8).

12. The sliding valve according to claim 1, wherein the support elements (13, 15; 14, 16) which interact in the second position of the valve rod (8) form a rotational support, with the support unit (12) pivoting about the rotational axis (17) of the rotational support from the starting position into the end position when the valve rod (8) is moved from the second to the third position.

* * * * *